Patented Jan. 16, 1934

1,943,374

UNITED STATES PATENT OFFICE 1,943,374

FOODSTUFF

Camille Dreyfus, New York, N. Y.

No Drawing. Application July 8, 1931
Serial No. 549,567

4 Claims. (Cl. 99—11)

This invention relates to foodstuffs, and relates more particularly to foodstuffs that are adapted to promote the peristaltic action of the intestines.

An object of my invention is to prepare foodstuffs containing water-resistant organic derivatives of cellulose that are adapted to promote peristaltic action. Other objects of this invention will appear from the following detailed description.

The foods as usually prepared and consumed by modern civilized peoples are refined to such a degree that they do not contain sufficient amount of indigestible matter or so called roughage to induce the proper peristaltic action so that unless precautions are taken, constipation and its attendant evil effects are very likely to result. To overcome this effect, bran and like material has been added to foodstuffs. These materials are made of or contain cellulose which tend to swell in water or other aqueous fluids that occur in the digestive tract, with the result that harmful effects are likely to result from their injudicious use.

I have found that cellulose acetate, or other organic derivatives of cellulose that are resistant to water, when added to foodstuffs, form an excellent roughage and therefore permit the proper functioning of the intestines so that normal elimination is rendered possible. Since these organic derivatives of cellulose are hardly affected by water or the digestive fluids, they do not tend to swell appreciably in the digestive tract so that the evil effects due to swelling are avoided.

In accordance with my invention, I prepare a foodstuff containing an organic derivative of cellulose that is substantially resistant to or not affected by water.

While I prefer to employ cellulose acetate, particularly the acetone-soluble variety, other water-resistant derivatives of cellulose including cellulose esters such as cellulose formate, cellulose propionate, cellulose butyrate or cellulose ethers, such as ethyl cellulose, methyl cellulose and benzyl cellulose may be employed. The derivative of cellulose should preferably be water-resistant; that is, it should not swell appreciably in water or the digestive fluids and should not dissolve therein.

The cellulose acetate or other organic derivative of cellulose may be added to the foodstuff in the form of fibres (such for instance as occurs when the solution of cellulose acetate in acetic acid in which it is formed is treated with water to precipitate the cellulose acetate), flakes, plates and the like of suitable size, say of the size of bran as is now used for the purpose. The cellulose acetate may be in finer size such as powder obtained by grinding the cellulose acetate, or it may be in larger size. Other forms of the cellulose acetate or other organic derivative of cellulose such as granules, shreds or strips of foil or film, as well as filaments of suitable length, may be employed.

The cellulose acetate or other organic derivative of cellulose is conveniently added to cereals which are adapted either to be cooked such as oatmeal or farina, or to the form of cereals already prepared and adapted to be eaten cold, which are in common use as breakfast foods. The organic derivative of cellulose may be added to the cereals by the manufacturer, or it may be added by the consumer to a receptacle of the cereal, while he is adding any other desired ingredients such as sugar and cream. However the cellulose acetate or other organic derivative of cellulose may be added to any other suitable food, such as bread, cakes, confections, vegetables, etc., etc.

It is to be understood that the foregoing detailed description is given merely by way of illustration and that many variations may be made therein without departing from the spirit of my invention.

Having described my invention, what I desire to secure by Letters Patent is:

1. A foodstuff adapted to promote peristaltic action containing a relatively water-resistant organic derivative of cellulose.

2. A foodstuff adapted to promote peristaltic action containing a water-resistant cellulose acetate.

3. A cereal food adapted to promote peristaltic action containing a water-resistant organic derivative of cellulose.

4. A cereal food adapted to promote peristaltic action containing a water-resistant cellulose acetate.

CAMILLE DREYFUS.